(12) United States Patent
Clavaud

(10) Patent No.: US 8,244,472 B2
(45) Date of Patent: Aug. 14, 2012

(54) ENABLING WELL-LOGGING INSTRUMENT DEVELOPMENT ON A COMMON, REALISTIC EARTH MODEL

(75) Inventor: Jean-Baptiste Clavaud, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 530 days.

(21) Appl. No.: 12/200,481

(22) Filed: Aug. 28, 2008

(65) Prior Publication Data

US 2010/0057364 A1  Mar. 4, 2010

(51) Int. Cl.
*G01V 3/18* (2006.01)
*G06G 7/48* (2006.01)
(52) U.S. Cl. .................... 702/6; 703/10; 703/9
(58) Field of Classification Search ........ 702/6; 703/10, 703/9; 166/250.01
See application file for complete search history.

(56) References Cited

U.S. PATENT DOCUMENTS

| | | | | |
|---|---|---|---|---|
| 5,703,773 | A * | 12/1997 | Tabarovsky et al. | 702/7 |
| 5,878,372 | A * | 3/1999 | Tabarovsky et al. | 702/7 |
| 6,816,787 | B2 * | 11/2004 | Ramamoorthy et al. | 702/7 |
| 7,529,152 | B2 * | 5/2009 | Sinha et al. | 367/31 |
| 7,672,824 | B2 * | 3/2010 | Dutta et al. | 703/10 |
| 8,121,823 | B2 * | 2/2012 | Krebs et al. | 703/10 |

OTHER PUBLICATIONS

Turner, A. Keith, "Challenges and trends for geological modelling and visualisation" Bulletin of Engineering Geology and the Environment, vol. 65, No. 2 (2006) http://www.springerlink.com/content/p0773683w1w2kg38/.*
A. Badruzzaman, A. Mendoza, E.J. Stockhausen and B.A. Reik, Density Measurements Sensitivity to Varying Borehole Angle and Tool Azimuth in Medium to Thin Beds, SPWLA 48$^{th}$ Annual Logging Symposium, Jun. 3-6, 2007, 1-15.
Barbara I. Anderson, Thomas D. Barber, Martin G. Luling Schlumberger, The Response of Induction Tools to Dipping, Anisptropic Formations, SPWLA 36$^{th}$ Logging Symposium, Paris, France, Jun. 26-29, 1995, 1-12.

* cited by examiner

*Primary Examiner* — Hal Wachsman
*Assistant Examiner* — Regis Betsch
(74) *Attorney, Agent, or Firm* — Marie L Clapp

(57) ABSTRACT

A system and method enable testing of a plurality of well-logging tools on a common, realistic earth model. To enable this testing, a model of a synthetic virtual geologic volume of interest is generated. From the synthetic virtual geologic volume of interest, a plurality of test properties are determined as a function of position within the virtual geologic volume of interest, wherein the test properties are measurable in actual geologic volumes of interest by a well-logging instruments. The individual test properties are then distributed to well-logging instrument developers with the model of the synthetic virtual geologic volume of interest to enable modeling and/or benchmarking of different well-logging instruments on the synthetic virtual geologic volume of interest and the ability to derive the original formation properties regardless of the method used (inversion, analytical solution, etc.).

15 Claims, 3 Drawing Sheets

ENABLING WELL-LOGGING INSTRUMENT DEVELOPMENT ON A COMMON, REALISTIC EARTH MODEL

FIELD OF THE INVENTION

The invention relates to the development of an earth model and test properties therefore for use in well-logging instrument development.

BACKGROUND OF THE INVENTION

In the development of well-logging instruments for use in boreholes in subsurface volumes of interest to detect properties of the subsurface volumes of interest such as resistivity, density, gamma ray, and/or other properties, synthetically generated data sets are used for modeling and/or benchmarking well-logging instruments. The synthetically generated data sets typically include large, uniform blocks of space with uniform and/or contiguous values for the properties measured by the well-logging instrument being modeled and/or benchmarked. These data sets are not based on an earth model of a real or synthetic subsurface volume of interest. Instead, data sets are simply generated and/or adjusted for the relevant test property according to user input. For example, a user may specifically designate values for the relevant test property that are to be associated with predetermined spaces surrounding the well-logging instrument.

SUMMARY

One aspect of the invention relates to a method of enabling testing of a plurality of well-logging tools on a common earth model. In one embodiment, the method comprises generating a model of a virtual geologic volume of interest, wherein the model of the virtual geologic volume of interest describes the structure and composition of mineralogy and fluid present in the virtual geologic volume of interest, and wherein generation of the model of the virtual geologic volume of interest is not based on real world measurements; determining a first test property as a function of position within the virtual geologic volume of interest, wherein the first test property is measurable in actual geologic volumes of interest by a first well-logging tool; determining a second test property as a function of position within the virtual geologic volume of interest, wherein the second test property is measurable in actual geologic volumes of interest by a second well-logging tool that is different from the first well-logging tool; providing the first test property as a function of position within the virtual geologic volume of interest and a representation of the model of the virtual geologic volume of interest to enable a simulated test of the virtual geologic volume of interest by the first well-logging tool; and providing the second test property as a function of position within the virtual geologic volume of interest and the representation of the model of the virtual geologic volume of interest to enable a simulated test of the virtual geologic volume of interest by the second well-logging tool.

Another aspect of the invention relates to a method of generating a model of a virtual geologic volume of interest. In one embodiment, the method comprises receiving a selection by a user of a number of formations in the virtual geologic volume of interest; receiving from the user one or more preliminary information related to formation parameters and/or properties for individual ones of the formations; randomly generating, from the preliminary information for individual ones of the formations, a model of the formations of the virtual geologic volume of interest that defines the geologic properties of the formations of the virtual geologic volume of interest as a function of position in the virtual geologic volume of interest, wherein the geologic properties of the formations of the virtual geologic volume of interest describe the structure and composition of the mineralogy within the formations; receiving from the user one or more fluid properties of one or more fluids contained within the virtual geologic volume of interest, wherein the one or more fluid properties describe the structure and composition of the one or more fluids contained within the virtual geologic volume of interest; and populating the model of the formations of the virtual geologic volume of interest with the one or more fluids for which the one or more fluid properties have been received, thereby generating a model of the virtual geologic volume of interest that describes the structure and composition of the mineralogy and fluid within the virtual geologic volume of interest.

Yet another aspect of the invention relates to a system configured to generate a model of a virtual geologic volume of interest. In one embodiment, the system comprises a preliminary formation information module, a formation property module, a fluid property module, and a fluid population module. The preliminary formation information module is configured to obtain a number of formations in the virtual geologic volume of interest, and to obtain preliminary information related to properties and/or parameters for individual ones of the formations. The formation property module is configured to generate a model of the formations of the virtual geologic volume of interest by randomly determining, from the preliminary information, the geologic properties of the formations of the virtual geologic volume of interest as a function of position in the virtual geologic volume of interest, wherein the geologic properties of the formations of the virtual geologic volume of interest describe the structure and composition of the mineralogy within the formations. The fluid property module is configured to obtain one or more fluid properties of one or more fluids contained within the virtual geologic volume of interest, wherein the one or more fluid properties describe the structure and composition of the one or more fluids contained within the virtual geologic volume of interest. The fluid population module is configured to populate the model of the formations of the virtual geologic volume of interest generated by the formation property module with the one or more fluids for which the one or more fluid properties have been obtained by the fluid property module, thereby generating a model of the virtual geologic volume of interest that describes the structure and composition of the mineralogy and fluid within the virtual geologic volume of interest.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
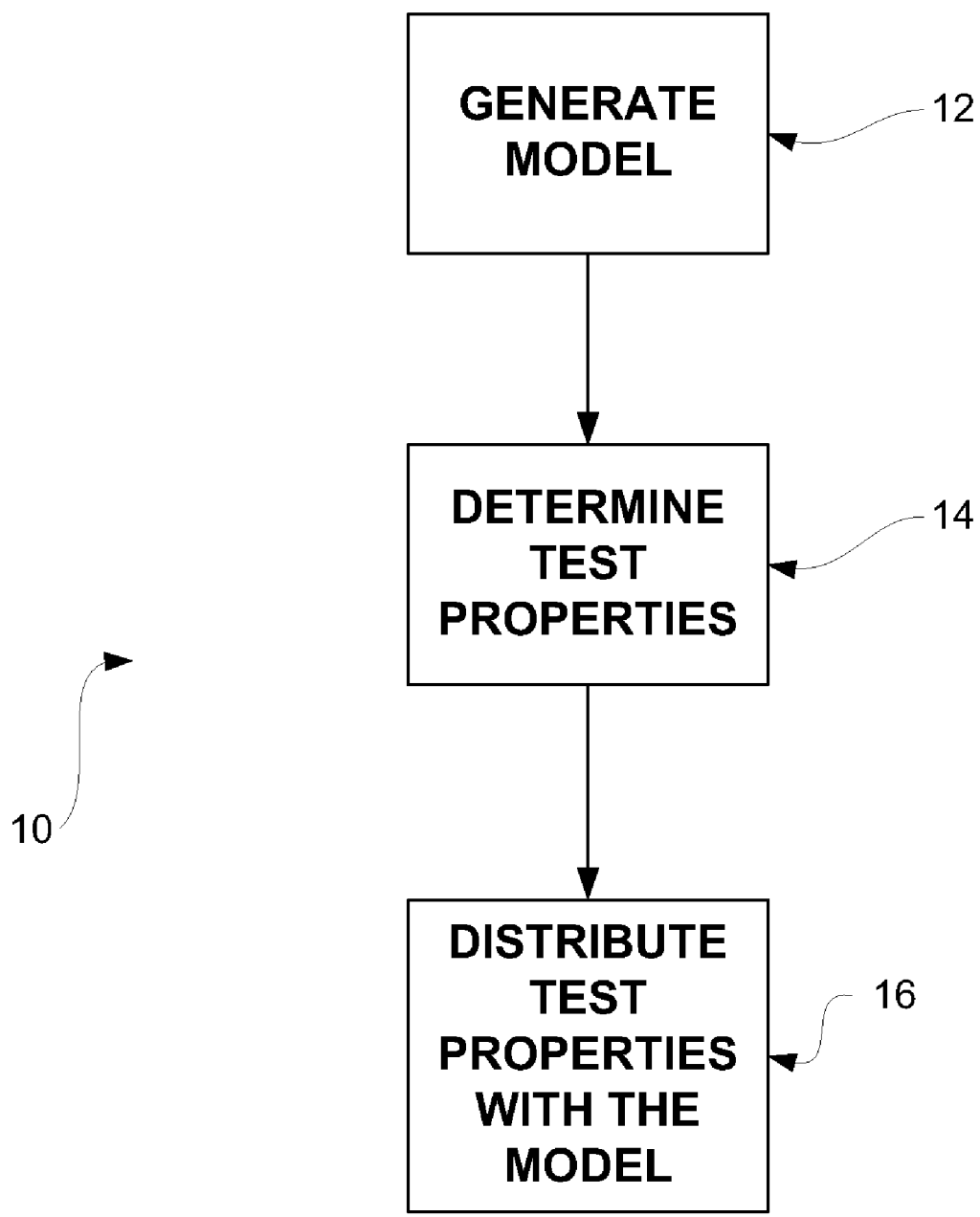
FIG. 1 illustrates a method of enabling modeling and/or benchmarking of a plurality of well-logging instruments on a common, synthetic earth model, in accordance with one or more embodiments of the invention.

FIG. 1 illustrates a method 10 of enabling modeling and/or benchmarking of a plurality of well-logging tools on a common, synthetic earth model. The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

As illustrated in FIG. 1, method 10 includes an operation 12, at which a model of a virtual geologic volume of interest is generated. The model generated describes the structure and composition of mineralogy and fluid present in the virtual geologic volume of interest. The virtual geologic volume of interest is "synthetic" because it is not based on real world geologic volume of interest and/or measurements of one or more real world geologic volume of interest. However, the synthetic virtual geologic volume of interest, as described by the model generated at operation 12 is a plausible geologic volume of interest. In other words, the properties of the mineralogy and/or fluid in the virtual geologic volume of interest are distributed in a configuration intended to mimic distributions of properties that could plausibly occur in the real world (e.g., according to a random, pseudo-random, and/or stochastic distribution).

At an operation 14, a set of test properties of the virtual geologic volume of interest are determined as a function of position within the virtual geologic volume of interest. The set of test properties include one or more properties of the virtual geologic volume of interest that are measurable via well-logging tools (either wireline, or logging-while-drilling). For example, the set of test properties may include one or more of resistivity (vertical and/or horizontal), density, gamma ray, bulk and shear moduli, shear and compressional velocity, NMR longitudinal and transverse relations time distribution, dielectric properties, temperature and pressure, and/or other properties. The determination of the set of test properties within the virtual geologic volume of interest as a function of position in the virtual geologic volume of interest are determined at operation 14 according to the distribution of mineralogy and fluid properties described in the model generated at operation 12. As such, the functions of the set of test properties correspond to the functions of test properties within the virtual geologic volume of interest that would actually occur in the real world if the virtual geologic volume of interest were a real world geologic volume of interest.

At an operation 16, one or more of the functions describing the distribution of one or more test properties in the set of test properties within the virtual geologic volume of interest are provided for use in testing well-logging instrument response. The one or more functions are provided with the model of the virtual geologic volume of interest. Providing a given test property within the virtual geologic volume of interest to an entity involved in the development and/or testing of a well-logging instrument that measures the given test property and/or generates models of geologic volumes based on measurements of the given test property provides several enhancements over existing technology.

For example, the information provided to instrument testers and/or developers at operation 16 with respect to the given test property and the virtual geologic volume of interest provides a realistic, geologically constrained model of the distribution of the test property within a geologic volume of interest that can be used to model and/or benchmark well-logging instruments that measure the given test property. By contrast, conventional methods for modeling and/or benchmarking well-logging instruments use distributions of the given test property that are uniform, unrealistic, and uncorrelated.

As another non-limiting example of the enhancements afforded to instrument development by method 10, the performance of operations 14 and 16 where the set of test properties includes a plurality of test properties (e.g., a first test property and a second test property, etc.), includes distribution of the individual test properties at operation 16 with the model of the virtual geologic volume of interest to entities that develop different types of well-logging instruments. This enables well-logging instruments that measure different test properties to be modeled and benchmarked against the same formation model during development. Generally, entities that develop and/or test various types of well-logging instruments work separately, such that each different type of well-logging instrument is modeled and benchmarked for formation models developed only for an individual test property.

Figure 2:
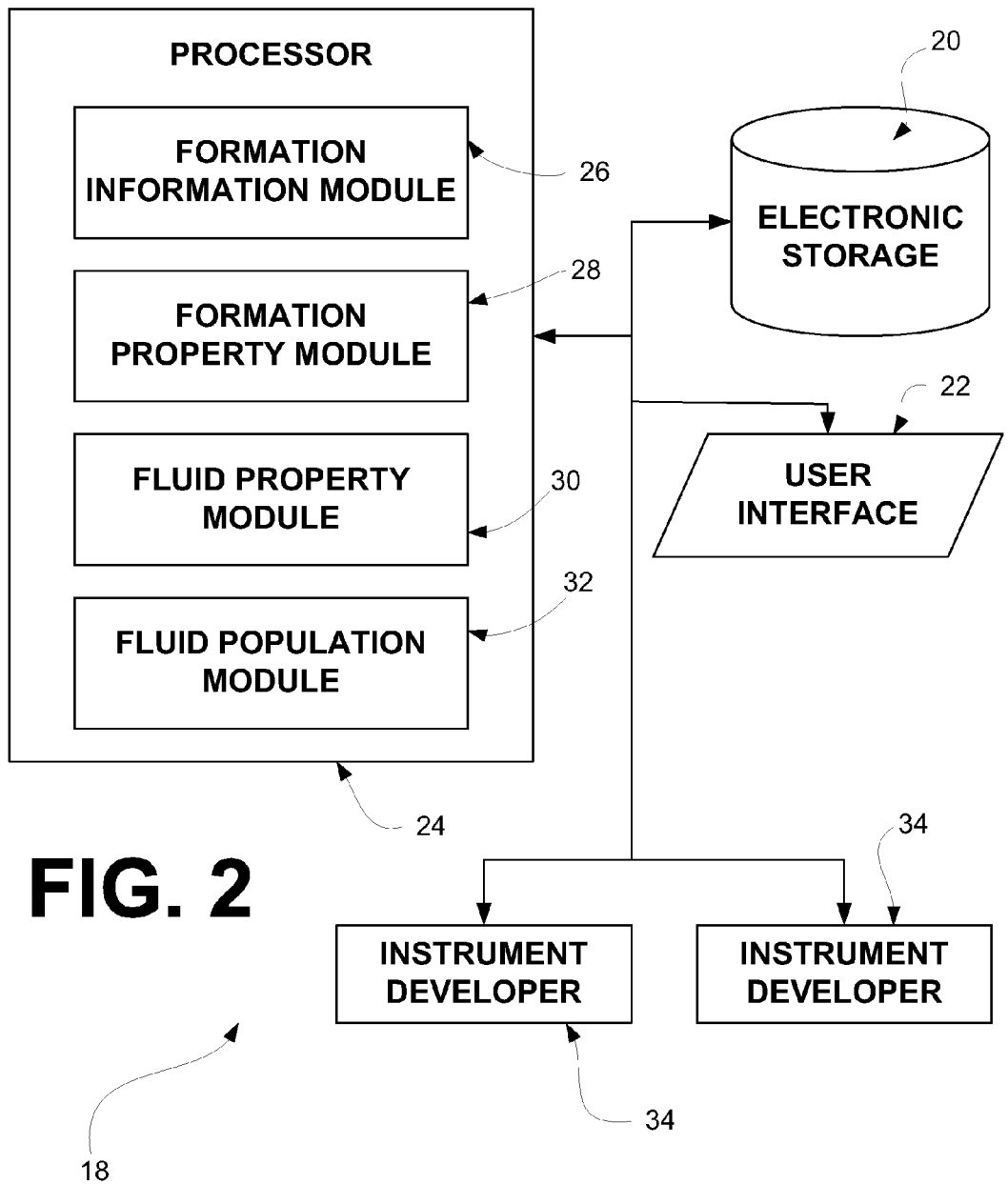
FIG. 2 illustrates a system configured to generate a model of a virtual geologic volume of interest, according to one or more embodiments of the invention.

FIG. 2 illustrates a system 18 configured to generate a model of a virtual geologic volume of interest. In one embodiment, system 18 is configured such that the model of the virtual geologic volume of interest describes a synthetic geologic volume of interest, as was discussed above with respect to method 10. It should be appreciated that in some instances, system 18 may be implemented to perform one or more of operations described above with respect to method 10. However, this is not intended to be limiting, and the models of virtual geologic volumes of interest generated by system 18 may used in other settings and/or for other purposes. In one embodiment, system 18 includes electronic storage 20, a user interface 22, and a processor 24.

In one embodiment, electronic storage 20 comprises electronic storage media that electronically stores information. The electronically storage media of electronic storage 20 may include one or both of system storage that is provided integrally (i.e., substantially non- removable) with system 18 and/or removable storage that is removably connectable to system 18 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 20 may store software algorithms, information determined by processor 24, information received via user interface 22, and/or other information that enables system 10 to function properly. Electronic storage 20 may be a separate component within system 10, or electronic storage 20 may be provided integrally with one or more other components of system 18 (e.g., processor 24).

In one embodiment, user interface 22 is configured to provide an interface between system 18 and one or more users through which the one or more users may provide information to and receive information from system 18. This enables data, results, and/or instructions and any other communicable items, collectively referred to as "information," to be communicated between the one or more users and other components of system 18 (e.g., one or both of processor 24 and/or electronic storage 20). Examples of interface devices suitable for inclusion in user interface 22 include a keypad, buttons, switches, a keyboard, knobs, levers, a display screen, a touch screen, speakers, a microphone, an indicator light, an audible alarm, and a printer. In one embodiment, user interface 22 actually includes a plurality of separate interfaces.

It is to be understood that other communication techniques, either hard-wired or wireless, are also contemplated by the present invention as user interface 22. For example, the present invention contemplates that user interface 22 may be integrated with a removable storage interface provided by electronic storage 20. In this example, information may be loaded into system 18 from removable storage (e.g., a smart card, a flash drive, a removable disk, etc.) that enables the user(s) to customize the implementation of system 18, provide data to system 18, receive results from system 18, and/or otherwise communicate information with system 18. Other exemplary input devices and techniques adapted for use with system 18 as user interface 22 include, but are not limited to, an RS-232 port, RF link, an IR link, modem (telephone, cable or other). In short, any technique for communicating information with system 18 is contemplated by the present invention as user interface 22.

In one embodiment, processor 24 is configured to provide information processing capabilities in system 18. As such, processor 24 may include one or more of a digital processor, an analog processor, a digital circuit designed to process information, an analog circuit designed to process information, a state machine, and/or other mechanisms for electronically processing information. Although processor 24 is shown in FIG. 2 as a single entity, this is for illustrative purposes only. In some implementations, processor 24 may include a plurality of processing units. These processing units may be physically located within the same device, or processor 24 may represent processing functionality of a plurality of devices operating in coordination.

As is shown in FIG. 2, in one embodiment, processor 24 includes a preliminary formation information module 26, a formation property module 28, a fluid property module 30, a fluid population module 32, and/or other modules. Modules 26, 28, 30, and/or 32 may be implemented in software; hardware; firmware; some combination of software, hardware, and/or firmware; and/or otherwise implemented. It should be appreciated that although modules 26, 28, 30, and 32 are illustrated in FIG. 2 as being co-located within a single processing unit, in implementations in which processor 24 includes multiple processing units, modules 26, 28, 30, and/or 32 may be located remotely from the other modules. Further, the description of the functionality provided by the different modules 26, 28, 30, and/or 32 described below is for illustrative purposes, and is not intended to be limiting, as any of modules 26, 28, 30, and/or 32 may provide more or less functionality than is described. For example, one or more of modules 26, 28, 30, and/or 32 may be eliminated, and some or all of its functionality may be provided by other ones of modules 26, 28, 30, and/or 32. As another example, processor 24 may include one or more additional modules that may perform some or all of the functionality attributed below to one of modules 26, 28, 30, and/or 32.

In one embodiment, preliminary formation information module 26 is configured to obtain a number of formations to be included in the virtual geologic volume of interest, and to obtain preliminary information related to formation properties and/or parameters for individual ones of the formations. Generally, geologic volumes are formed from a plurality of separate formations. In lithostratigraphy a "formation" forms the fundamental unit of geologic volumes, and one exemplary, non-limiting example of a definition of a formation is a body of strata sufficiently distinctive and continuous to be mapped. Formations themselves may also be formed by separate parts, referred to herein as "beds." The one or more parameters and/or properties for individual ones of the formations for which preliminary information is obtained by preliminary formation information module 26 may include one or more of a number of beds, a porosity, a cation exchange capacity, formation thickness, the order in which a formation is disposed within the virtual geologic volume of interest, absolute and/or relative permeability, grain density, hydrogen index, chemical composition, mineralogy, natural radioactivity, cross-capture section, bulk and shear modulus, grain size and sorting, shear and compressional velocity, NMR longitudinal and transverse relaxation time distribution, dielectric properties, and/or a capillary pressure curve.

In addition to obtaining preliminary information related to formation parameters and/or properties for individual ones of the formations within the virtual geologic volume of interest, preliminary formation information module 26 may also obtain preliminary information related to parameters and/or properties of a mud invasion of one or more of the formations in the virtual geologic volume of interest. A mud invasion occurs when a mud filtrate and/or whole mud displaces some or all of the moveable fluids in a formation, creating an invaded zone. The one or more preliminary information may be related to one or more of a mud type (e.g., oil based mud, water based mud, etc.), one or more mud properties (e.g., density, salinity, barite and/or Potassium content, etc.), an invasion diameter, an invasion profile, and/or other invasion parameters or properties.

In one embodiment, preliminary formation information module 26 is configured to obtain the number of formations in the virtual geologic volume of interest and/or other preliminary information related to formation parameters and/or properties from one or more users of system 18 (e.g., via user interface 22), from electronic storage 20, and/or from other sources. For example, in some implementations, preliminary formation information module 26 configures an interface (e.g., a graphical user interface) that is presented to a user via interface 22. The interface enables the user to input commands dictating the number of formations in the virtual geologic volume of interest, and provides predefined fields, selectable menus, and/or other interface techniques for enabling the user to provide other preliminary information related to formation parameters and/or properties to preliminary formation information module 26.

In one embodiment, formation property module 28 is configured to generate a model of the formations within the virtual geologic volume of interest in accordance with the information received via preliminary formation information module 26. In order to generate this model, formation property module 28 determines the geologic properties and/or parameters of the formations of the virtual geologic volume of interest as a function of position in the virtual geologic volume of interest. The geologic properties and/or parameters of the formations describe the structure and composition of the mineralogy that forms the formations. The geologic properties and/or parameters of the formations are determined by formation property module 28 according to the preliminary information obtained via preliminary formation information module 26. In particular, one or more of the geologic properties and/or parameters of the formations are determined by formation property module 28 randomly from the corresponding preliminary information. The preliminary information corresponding to a given formation property and/or parameter may include a mean value and a standard deviation. This may enable the given formation property and/or parameter to be determined by formation property module 28 randomly in conformance with the obtained mean value and standard deviation.

By way of non-limiting example, in one instance, the obtained preliminary information includes a number of beds within a given formation, and thickness of the formation. From this preliminary information, formation property module 28 generates a virtual model of the given formation having the appropriate number of beds, with the beds having varying thicknesses about a mean value with a predetermined standard deviation. The mean value and/or the standard deviation may be specified in, or derived from, the preliminary information obtained by preliminary formation information module 26. The distribution of bed thickness about the mean value may be, for example, log-normal or normal. If the obtained preliminary information related to the given formation includes information related to overall end member lithologies for the given formation (e.g., percentages of sand, shale, limestone, dolomite, etc.), then lithologies of the beds within the formation are formed randomly such that the obtained overall end member lithologies form a mean value for the lithologies, with the actual bed lithologies varying around the mean values in accordance with one or more predetermined standard deviations. The mean values and/or the standard deviations may be obtained by preliminary formation information module 26 (e.g., from a user). Similarly, other geologic properties and/or parameters of the beds in the given formation are also determined randomly from the corresponding preliminary information received by preliminary formation information module 26 (e.g., as probability distributions). In some instances, one or more of the mean values and/or the predetermined standard deviations used to determine geologic properties and/or parameters (e.g., as probability distributions) are configurable by a user (e.g., via user interface 22 and/or preliminary formation information module 26).

In one embodiment, fluid property module 30 is configured to obtain one or more fluid properties of one or more fluids contained within the virtual geologic volume of interest. The one or more fluid properties describe the structure and composition of the one or more fluids. The one or more fluid properties may indicate a fluid type, such as, for example, an oil fluid, a gas fluid, or a brine. The one or more fluid properties may specify an oil/water contact level, which is the level in the virtual geological volume of interest where a section of fluid that is primarily oil and a section of fluid that is primarily brine (e.g., water) interface. The one or more fluid properties may specify an oil/gas contact level, which is the level in the virtual geological volume of interest where a section of fluid that is primarily oil and a section of fluid that is primarily gas interface. In one embodiment, the one or more fluid properties may include properties related to a borehole formed through the virtual geologic volume of interest (e.g., diameter, cross-section, deviation, inclination, etc.). In one embodiment, some or all of the properties related to the borehole may be included in the preliminary information obtained by preliminary formation information module 26, rather than obtained by fluid property module 30.

In one embodiment, fluid property module 30 is configured to obtain the one or more fluid properties from one or more users of system 18 (e.g., via user interface 22), from electronic storage 20, and/or from other sources. For example, in some implementations, fluid property module 30 configures an interface (e.g., a graphical user interface) that is presented to a user via interface 22. The interface enables the user to input commands dictating the one or more fluid properties and/or borehole properties, and provides predefined fields, selectable menus, and/or other interface techniques for enabling the user to provide the fluid properties and/or borehole properties to fluid property module 30.

Fluid population module 32 is configured to populate the model of the formations of the virtual geologic volume of interest generated by the formation property module with fluids having the fluid properties obtained by fluid property module 30. This results in the generation of a model of the virtual geologic volume of interest that describes the structure and composition of the mineralogy and fluid within the virtual geologic volume of interest.

In instances in which the preliminary information obtained by preliminary formation information module 26 includes information related to one or more properties and/or parameters of a mud invasion of one or more of the virtual geologic volume of interest, formation property module 28 adjusts the model of the virtual geologic volume of interest to include an invasion with properties dictated by and/or determined from the preliminary information related to the invasion and the mud properties. Formation property module 28 includes the invasion in the model of the virtual geologic volume of interest by correcting the model for invasion effects. One or more of the properties of the invasion may be determined randomly based on the preliminary information related to the property and/or parameters received from preliminary formation information module 26.

From the model of the virtual geologic volume of interest, one or more test properties of the virtual geologic volume of interest can determined as a function of position within the virtual geologic volume of interest, as was discussed above with respect to method 10 of FIG. 1. In one embodiment, processor 24 includes one or more additional modules that determine and/or distribute the information related to the one or more test properties. For example, the information related to the one or more test properties may be determined by processor 24, and then distributed, along with the model of the virtual geologic volume of interest, to one or more instrument developers 34 for modeling and/or benchmarking well-logging instruments that measure one or more of the test properties.

Figure 3:
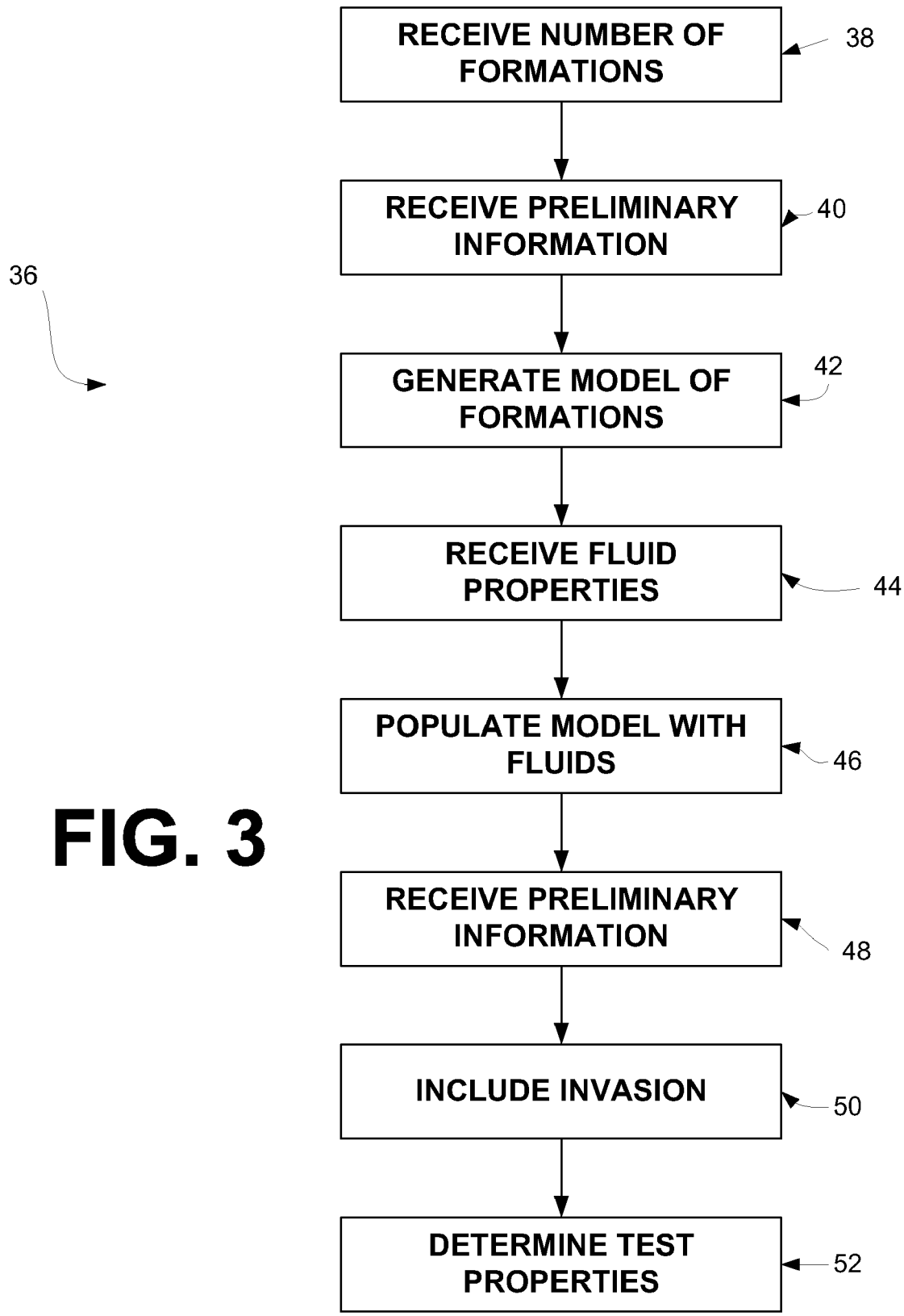
FIG. 3 illustrates a method of generating a model of a virtual geologic volume of interest, in accordance with one or more embodiments of the invention.

FIG. 3 illustrates a method 36 of generating a model of a virtual geologic volume of interest. The operations of method 36 presented below are intended to be illustrative. In some embodiments, method 36 may be accomplished with one or more additional operations not described, and/or without one or more of the operations discussed. Additionally, the order in which the operations of method 36 are illustrated in FIG. 3 and described below is not intended to be limiting.

In some embodiments, method 36 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 36 in response to instructions stored electronically on an electronic storage medium. The one or more processing devices may include one or more devices configured through hardware, firmware, and/or software to be specifically designed for execution of one or more of the operations of method 36. For example, some or all of the operations of method 36 may be performed by components of system 18 (shown in FIG. 2 and described above), such as processor 24. However, this is not intended to be limiting, and method 36 may be implemented in other embodiments in the context of other systems.

As shown in FIG. 3, method 36 includes an operation 38, at which a number of formations in the virtual geologic volume of interest is received from a user. In one embodiment, operation 38 is performed by a preliminary formation information module that is similar to or the same as preliminary formation information module 26 (shown in FIG. 2 and described above).

At an operation 40, preliminary information related to one or more parameters and/or properties of the formations that make up the virtual geologic volume of interest is received from the user for individual ones of the formations. The preliminary information for an individual formation may be related to one or more of a number of beds, a porosity, a cation exchange capacity, formation thickness, the order in which a formation is disposed within the virtual geologic volume of interest, absolute and/or relative permeability, grain density, hydrogen index, chemical composition, mineralogy, natural radioactivity, cross-capture section, bulk and shear modulus, grain size and sorting, a capillary pressure curve, and/or other formation parameters and/or properties. In one embodiment, operation 40 may be performed by the preliminary formation information module 26 (shown in FIG. 2 and described above).

At an operation 42, a model of the formations that form the virtual geologic volume of interest is generated. The model of the formations that form the virtual geologic volume of interest defines the geologic properties of the formations as a function of position within the virtual geologic volume of interest. The geologic properties of the formations describe the structure and composition of the mineralogy within the formations. In one embodiment, operation 42 is performed by a formation property module that is the same as or similar to formation property module 28 (shown in FIG. 2 and described above).

At an operation 44, one or more fluid properties of one or more fluids contained within the virtual geologic volume of interest are received from the user. The one or more fluid properties describe the structure and composition of the one or more fluids contained within the virtual geologic volume of interest beyond the invaded zone (i.e., in the virgin zone, also known as the un-invaded zone). The one or more fluid properties may indicate a fluid type, such as, for example, an oil fluid, a gas fluid, or a brine. The one or more fluid properties may specify a oil/water contact level, which is the level in the virtual geological volume of interest where a section of fluid that is primarily oil and a section of fluid that is primarily brine (e.g., water) interface. The one or more fluid properties may specify an oil/gas contact level, which is the level in the virtual geological volume of interest where a section of fluid that is primarily oil and a section of fluid that is primarily gas interface. In one embodiment, the one or more fluid properties may include properties related to a borehole formed through the virtual geologic volume of interest (e.g., diameter, cross-section, deviation, inclination, etc.). In one embodiment, some or all of the properties related to the borehole may be included in the preliminary information obtained with operation 40, rather than obtained with fluid properties at operation 44. In one embodiment, operation 44 is performed by a fluid property module that is the same as or similar to fluid property module 30 (shown in FIG. 2 and described above).

At an operation 46, the model of formations of the virtual geologic volume of interest generated at operation 42 is populated with the one or more fluids specified by the one or more fluid properties received at operation 44. The performance of operation 46 results in the generation of a model of the virtual geologic volume of interest that describes the structure and composition of the mineralogy and fluid within the virtual geologic volume of interest. In one embodiment, operation 46 is performed by a fluid population module that is the same as or similar to fluid population module 32 (shown in FIG. 2 and described above).

At an operation 48, preliminary information related to parameters and/or properties of an invasion within the virtual geologic volume of interest are received from the user. The preliminary information related to the parameters and/or properties of the invasion may be related to one or more of a mud type (e.g., oil based mud, water based mud, etc.), one or more mud properties (e.g., density, salinity, barite and/or Potassium content, etc.), an invasion diameter, an invasion profile, and/or other invasion parameters or properties. In one embodiment, operation 48 may be performed by the preliminary formation information module 26 (shown in FIG. 2 and described above).

At an operation 50, a mud invasion in the model of the formations forming the virtual geologic volume of interest is generated. Generating the mud invasion in the formations includes correcting the formation properties for invasion effects. The properties of the invasion may be determined based on the preliminary information obtained at operation 48. In one embodiment, operation 50 is performed by the formation property module 28 (shown in FIG. 2 and described above).

At an operation 52, one or more test properties of the virtual geologic volume of interest are determined as a function of position within the virtual geologic volume of interest from the model of formation properties generated at operation 50. The one or more test properties include at least one property that is measurable by a well-logging instrument. The information determined at operation 52 may be distributed, along with the model of the virtual geologic volume of interest generated at operation 50, to one or more instrument developers for modeling and/or benchmarking well-logging instruments that measure one or more of the test properties.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of generating simulated data for a hypothetical rock formation to enable testing of a plurality of well-logging tools, the method comprising:

generating, via a computer, a model of a hypothetical virtual geologic volume of interest not from an existing known wellbore formation, wherein the model of the hypothetical virtual geologic volume of interest describes the structure and composition of mineralogy and fluid present in the hypothetical virtual geologic volume of interest, and wherein properties of the mineralogy and the fluid in the hypothetical virtual geologic volume of interest are distributed in a configuration intended to mimic distributions of properties that occur in real world geologic volumes;

determining a first test property as a function of position within the virtual geologic volume of interest, wherein the first test property is a first type of simulated data and wherein the first test property is measurable in actual geologic volumes of interest by a first well-logging tool;

determining a second test property as a function of position within the virtual geologic volume of interest, wherein the second test property is a second type of simulated data and wherein the second test property is measurable in actual geologic volumes of interest by a second well-logging tool that is different from the first well-logging tool;

providing the first test property as a function of position within the hypothetical virtual geologic volume of interest and a representation of the model of the hypothetical virtual geologic volume of interest to enable a simulated test of the hypothetical virtual geologic volume of interest by the first well-logging tool; and providing the second test property as a function of position within the hypothetical virtual geologic volume of interest and the representation of the model of the hypothetical virtual geologic volume of interest to enable a simulated test of the hypothetical virtual geologic volume of interest by the second well-logging tool.

2. The method of claim 1, wherein provision of the first test property as a function of position within the hypothetical virtual geologic volume of interest and the representation of the model of the hypothetical virtual geologic volume of interest is separate from the provision of the second test property as a function of position within the hypothetical virtual geologic volume of interest and the representation of the model of the hypothetical virtual geologic volume of interest.

3. The method of claim 1, wherein one or both of the first well-logging tool and/or the second well-logging tool comprise a wireline well-logging tool.

4. The method of claim 1, wherein one or both of the first well-logging tool and/or the second well-logging tool comprise a logging-while-drilling well-logging tool.

5. The method of claim 1, wherein one or more properties of the model of the hypothetical virtual geologic volume of interest are determined randomly.

6. A method of generating a model of a hypothetical virtual geologic volume of interest not from an existing known wellbore formation, the method comprising:

receiving a selection by a user of a number of formations to be generated in the hypothetical virtual geologic volume of interest;

receiving from the user one or more preliminary information related to formation parameters and/or properties for individual ones of the formations to be generated in the hypothetical virtual geologic volume of interest;

randomly generating, via a computer and from the preliminary information for individual ones of the formations, a model of the formations of the hypothetical virtual geologic volume of interest that defines the geologic properties of the formations of the hypothetical virtual geologic volume of interest as a function of position in the hypothetical virtual geologic volume of interest, wherein the geologic properties of the formations of the hypothetical virtual geologic volume of interest describe the structure and composition of the mineralogy within the formations;

receiving from the user one or more fluid properties of one or more fluids contained within the hypothetical virtual geologic volume of interest, wherein the one or more fluid properties describe the structure and composition of the one or more fluids contained within the hypothetical virtual geologic volume of interest; and populating, via a computer, the model of the formations of the hypothetical virtual geologic volume of interest with the one or more fluids for which the one or more fluid properties have been received, thereby generating a model of the hypothetical virtual geologic volume of interest that describes the structure and composition of the mineralogy and fluid within the hypothetical virtual geologic volume of interest.

7. The method of claim 6, further comprising:

receiving from the user, preliminary information related to parameters and/or properties of an invasion of one or more of the formations in the hypothetical virtual geologic volume of interest; and randomly generating the invasion within the one or more formations in the hypothetical virtual geologic volume of interest according to the received preliminary information, wherein generating the invasion within the one or more formations causes the model of the hypothetical virtual geologic volume of interest to reflect the structure and composition of the invasion.

8. The method of claim 6, wherein the preliminary information relates to one or more of a number of beds, relative amounts of end members forming a formation, a porosity, a cation exchange capacity, a number of sub-formations, formation thickness, the order in which a formation is disposed within the virtual geologic volume of interest, absolute and/or relative permeability, grain density, hydrogen index, chemical composition, mineralogy, natural radioactivity, cross-capture section, grain size and sorting, bulk and shear moduli, shear and compressional velocity, NMR longitudinal and transverse relations time distribution, dielectric properties, temperature and pressure, or a capillary pressure curve.

9. The method of claim 6, wherein the preliminary information relates to one or more properties of a hypothetical borehole through the hypothetical virtual geologic volume of interest.

10. The method of claim 6, further comprising determining, from the model of the hypothetical virtual geologic volume of interest, a test property as a function of position within the hypothetical virtual geologic volume of interest, wherein the test property is a type of simulated data and wherein the test property is measurable in actual geologic volumes of interest by a well-logging tool.

11. A system configured to generate a model of a hypothetical virtual geologic volume of interest not from an existing known wellbore formation, the system comprising:

an electronic storage comprising electronic storage media;

a computer processor configured to communicate with the electronic storage and implement computer executable modules stored on at least one of the computer processor and the electronic storage, the modules comprising:

a preliminary formation information module configured to obtain a number of formations to be generated in the hypothetical virtual geologic volume of interest, and to obtain preliminary information related to properties and/or parameters for individual ones of the formations to be generated in the hypothetical virtual geologic volume of interest;

a formation property module configured to generate a model of the formations of the hypothetical virtual geologic volume of interest by randomly determining, from the preliminary information, the geologic properties of the formations of the virtual geologic volume of interest as a function of position in the hypothetical virtual geologic volume of interest, wherein the geologic properties of the formations of the hypothetical virtual geologic volume of interest describe the structure and composition of the mineralogy within the formations;

a fluid property module configured to obtain one or more fluid properties of one or more fluids contained within the hypothetical virtual geologic volume of interest, wherein the one or more fluid properties describe the structure and composition of the one or more fluids contained within the hypothetical virtual geologic volume of interest; and a fluid population module configured to populate the model of the formations of the hypothetical virtual geologic volume of interest generated by the formation property module with the one or more fluids for which the one or more fluid properties have been obtained by the fluid property module, thereby generating a model of the hypothetical virtual geologic volume of interest that describes the structure and composition of the mineralogy and fluid within the hypothetical virtual geologic volume of interest; and a user interface configured to communicate information between at least one user and at least one of the computer processor and the electronic storage.

12. The system of claim 11, wherein the preliminary information obtained by the preliminary formation information module comprise preliminary information related to properties and/or parameters for an invasion of one or more of the formations in the hypothetical virtual geologic volume of interest, and wherein the model of the hypothetical virtual geologic volume of interest is adjusted to reflect invasion effects.

13. The system of claim 11, wherein the preliminary information is related to one or more of a number of beds, relative amounts of end members forming a formation, a porosity, a cation exchange capacity, a number of sub-formations, formation thickness, the order in which a formation is disposed within the virtual geologic volume of interest, absolute and/or relative permeability, grain density, hydrogen index, chemical composition, mineralogy, natural radioactivity, cross-capture section, bulk and shear moduli, shear and compressional velocity, NMR longitudinal and transverse relations time distribution, dielectric properties, temperature and pressure, grain size and sorting, or a capillary pressure curve.

14. The system of claim 11, wherein the one or more initial formation parameters comprise one or more properties of a hypothetical borehole through the hypothetical virtual geologic volume of interest.

15. The system of claim 11, further comprising a test property module configured to determine, from the model of the hypothetical virtual geologic volume of interest, a test property as a function of position within the hypothetical virtual geologic volume of interest, wherein the test property is a type of simulated data and wherein the test property is measurable in actual geologic volumes of interest by a well-logging tool.

* * * * *